US011100147B2

(12) United States Patent
Yeh et al.

(10) Patent No.: US 11,100,147 B2
(45) Date of Patent: *Aug. 24, 2021

(54) ELECTRONIC LIST USER INTERFACE

(71) Applicant: GOOGLE LLC, Mountain View, CA (US)

(72) Inventors: Shih-Hao Yeh, Santa Clara, CA (US); Navid Samadani-McQuirk, San Bruno, CA (US)

(73) Assignee: Google LLC, Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/129,092

(22) Filed: Sep. 12, 2018

(65) Prior Publication Data

US 2019/0197182 A1 Jun. 27, 2019

Related U.S. Application Data

(60) Provisional application No. 62/610,010, filed on Dec. 22, 2017.

(51) Int. Cl.
G06F 16/33 (2019.01)
G06Q 30/06 (2012.01)
G06F 16/955 (2019.01)
G06F 16/9038 (2019.01)

(52) U.S. Cl.
CPC ...... G06F 16/3334 (2019.01); G06F 16/9038 (2019.01); G06F 16/955 (2019.01); G06Q 30/0625 (2013.01); G06Q 30/0633 (2013.01)

(58) Field of Classification Search
CPC ............ G06F 16/3334; G06F 16/955; G06F 16/9038; G06Q 30/0625; G06Q 30/0633

USPC ........................................................ 707/722
See application file for complete search history.

(56) References Cited

U.S. PATENT DOCUMENTS

| 10,198,762 | B1* | 2/2019 | Dangaltchev | G06F 16/248 |
| 2003/0120626 | A1* | 6/2003 | Piotrowski | G06F 16/3334 |
| 2004/0148226 | A1* | 7/2004 | Shanahan | G06Q 30/0601 |
| | | | | 705/14.73 |

(Continued)

FOREIGN PATENT DOCUMENTS

| JP | 2003-044756 A | 2/2003 |
| JP | 2005-025287 A | 1/2005 |

(Continued)

OTHER PUBLICATIONS

Arbutina "International Search Report and Written Opinion issued in International Application No. PCT/US2018/050702", dated Dec. 19, 2018, 14 pages.

(Continued)

Primary Examiner — Robert W Beausoliel, Jr.
Assistant Examiner — Arthur Ganger
(74) Attorney, Agent, or Firm — Foley & Lardner LLP

(57) ABSTRACT

Processing inputs to electronic list systems. Receiving, from a user device, a user input. Parsing the received user input for a minimum set of product data for querying a shopping service. Upon parsing a minimum set of product data for querying a shopping service, querying at least one shopping service using the parsed data. Receiving, from at least one queried shopping service, at least one product description responsive to the query. Presenting, via the user device, each received at least one product description to the user.

20 Claims, 9 Drawing Sheets

(56) References Cited

U.S. PATENT DOCUMENTS

| | | | |
|---|---|---|---|
| 2010/0125574 A1* | 5/2010 | Navas | G06F 16/2255 |
| | | | 707/722 |
| 2012/0010876 A1* | 1/2012 | Smolenski | G10L 15/22 |
| | | | 704/9 |
| 2014/0067564 A1 | 3/2014 | Yuan | |
| 2014/0095348 A1 | 4/2014 | Goulart | |
| 2015/0039462 A1 | 2/2015 | Shastry et al. | |
| 2015/0058154 A1 | 2/2015 | Appleyard et al. | |
| 2015/0242932 A1 | 8/2015 | Beguin et al. | |
| 2016/0048856 A1 | 2/2016 | Wouhaybi et al. | |
| 2016/0104254 A1* | 4/2016 | Zurada | G06Q 30/02 |
| | | | 705/319 |
| 2016/0275588 A1* | 9/2016 | Ye | G06F 3/0488 |
| 2018/0005305 A1* | 1/2018 | Hirsch | G06Q 30/0633 |
| 2018/0054408 A1* | 2/2018 | Morris | H04L 51/08 |
| 2018/0307761 A1* | 10/2018 | Felt | G06F 16/685 |
| 2019/0043473 A1* | 2/2019 | Levy | G06Q 30/0631 |
| 2019/0197183 A1* | 6/2019 | Yeh | G06Q 30/0633 |
| 2020/0272664 A1* | 8/2020 | Aggour | G06F 16/9038 |

FOREIGN PATENT DOCUMENTS

| | | |
|---|---|---|
| JP | 2005-267574 A | 9/2005 |
| JP | 2006-031200 A | 2/2006 |
| JP | 2009-009170 A | 1/2009 |
| JP | 2010-113390 A | 5/2010 |
| JP | 2010-277207 A | 12/2010 |
| JP | 2011-008428 A | 1/2011 |
| WO | WO-2012/165122 A1 | 12/2012 |
| WO | WO-2015/114731 A1 | 8/2015 |

OTHER PUBLICATIONS

Arbutina "International Search Report and Written Opinion issued in International Application No. PCT/US2018/050647", dated Dec. 19, 2018 14 pages.

International Search Report and Written Opinion of the International Searching Authority for PCT Appln. Ser. No. PCT/US2018/050647 dated Dec. 19, 2018 (10 pages).

International Preliminary Report on Patentability for PCT Appln. Ser. No. PCT/US2018/050647 dated Jul. 2, 2020 (8 pages).

Reasons for Rejection for JP Appln. Ser. No. 2020-519087 dated May 31, 2021 (13 pages).

U.S. Appl. No. 16/129,338 to Shih-Hao Yeh et al. filed Sep. 12, 2018.

* cited by examiner

300

Receive, from a user device, a user input
210

220

Parse the received user input for each of type of data in the set {product genus, product sun-genus(es), product name, brand name, price information, retailer name, manufacturer name, size, quantity}, wherein a minimum set of product data for querying a shopping service comprises a subset of the set
322

Upon parsing a minimum set of product data for querying a shopping service, query at least one shopping service using the parsed data
230

Receive, from at least one queried shopping service, at least one product description responsive to the query
240

250

Present, via the user device, a plurality of matching items in a hierarchy organized by product name, with lower hierarchy levels comprising one or more of price information, retailer name, manufacturer name, size, and quantity
452

FIG. 4

ELECTRONIC LIST USER INTERFACE

CROSS-REFERENCE TO RELATED APPLICATION

This patent application claims priority to U.S. Provisional Patent Application No. 62/610,010, filed Dec. 22, 2017 and entitled "Electronic List User Interface." The entire contents of the above-identified application are hereby fully incorporated herein by reference.

TECHNICAL FIELD

The technology disclosed herein is related to technologies to process inputs to electronic list systems. Particular examples relate to parsing user inputs for performing product searches.

SUMMARY

The technology described herein includes computer implemented methods, computer program products, and systems to process inputs to electronic list systems. In some examples, a list system receives, from a user device, a user input. The list system parses the received user input for a minimum set of product data for querying a shopping service. Upon parsing a minimum set of product data for querying a shopping service, the list system queries at least one shopping service using the parsed data. The list system receives, from at least one queried shopping service, at least one product description responsive to the query. The list system presents, via the user device, each received at least one product description to the user.

In some examples, parsing comprises, parsing the received user input for each of type of data in the set {product genus, product subgenus, product name, brand name, price information, retailer name, manufacturer name, size, quantity}. In such examples, a minimum set of product data for querying a shopping service comprises a subset of the set. In some examples, the user input is a voice input. In some examples, the technology further, in response to the presenting, receives from the user device user selection of a presented item.

In some examples, in response to receiving user selection of a presented item, the technology orders the item for the user from a shopping service associated with the selected item. In some examples, presenting includes presenting, via the user device, a plurality of matching items in a hierarchy organized by product name. In such embodiments, lower hierarchy levels include one or more of price information, retailer name, manufacturer name, size, and quantity. In some embodiments, presenting includes presenting the product name as an item in a list of the user along with the organized hierarchy.

These and other aspects, objects, features, and advantages of the technology described herein will become apparent to those having ordinary skill in the art upon consideration of the following detailed description of illustrated examples.

BRIEF DESCRIPTION OF THE DRAWINGS

FIG. 3 is a block diagram illustrating methods to process inputs to electronic list systems, in accordance with certain examples.

FIG. 4 is a block diagram illustrating methods to process inputs to electronic list systems, in accordance with certain examples.

DETAILED DESCRIPTION OF THE EXAMPLES

Smart electronic lists can leverage shopping data to help users shop a list. However, inputs to lists, such as voice and text inputs, suffer from several problems. For example, inputs can be one or more of: sporadic, generalized, and often poorly-focused. As another example, inputs can mix product description, product price, product source, and product brand information—in no certain order.

The combination of sporadic, generalized, mixed, and often poorly-focused inputs to such lists (including from multiple users of a single list), the requirement for highly-specific product descriptions required as inputs by shopping services, and the unavailability of non-electronic methods to reconcile the differences between such inputs, creates unaddressed problems unique to electronic commerce.

By using and relying on the methods and systems described herein, the technology disclosed herein can maintain, and in some examples shop, an accessible list that is organized and includes recommendations and other helpful features. As such, the technology may be employed to address problems unique to electronic lists in electronic commerce, such as the conflict described above.

Turning now to the drawings, in which like numerals represent like (but not necessarily identical) elements throughout the figures, examples of the present technology are described in detail.

Example System Architectures

Figure 1:
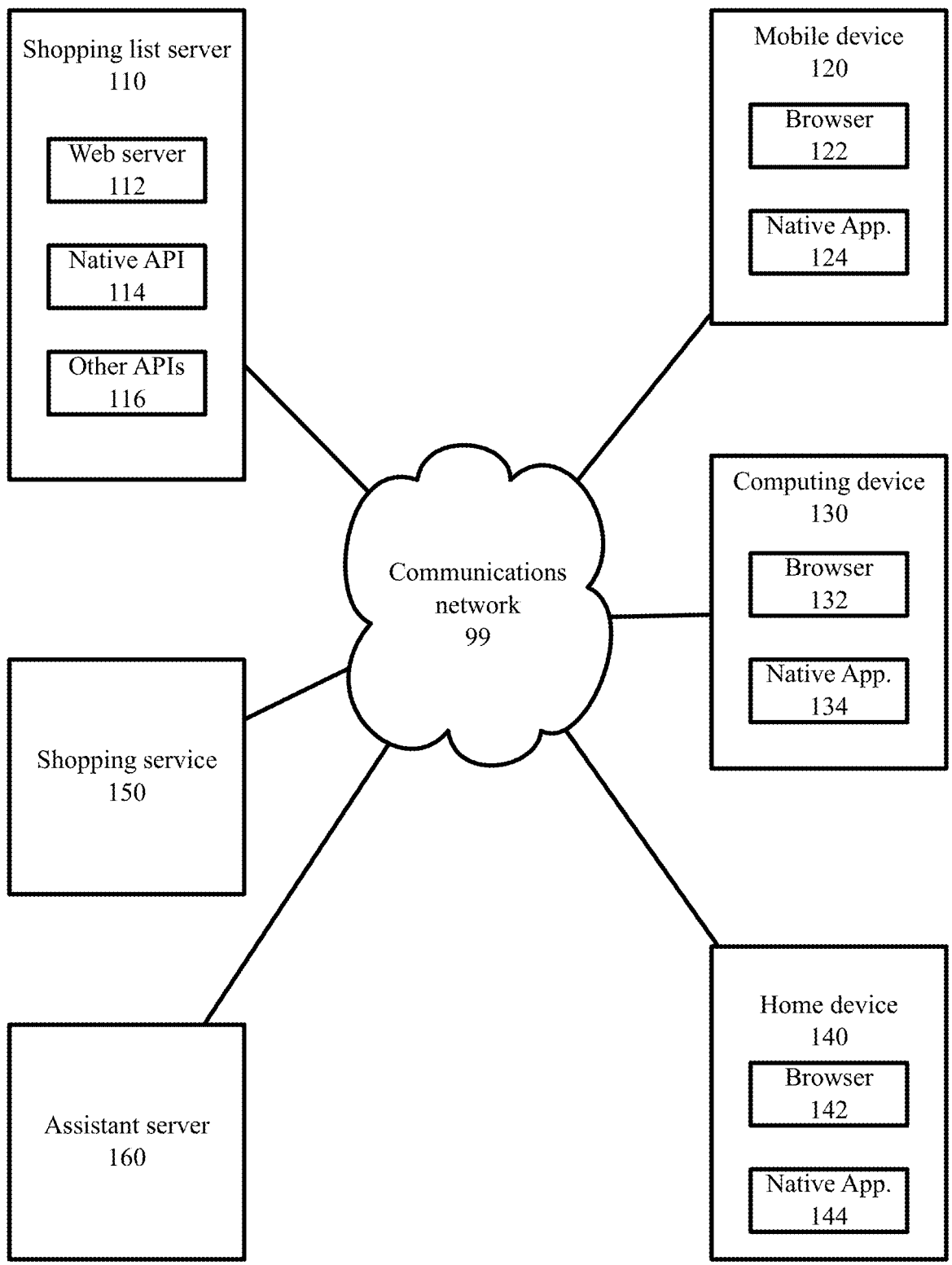
FIG. 1 is a block diagram depicting an operating environment to provide a user interface for an electronic list, in accordance with certain examples.

FIG. 1 is a block diagram depicting an example operating environment 100 in accordance with certain examples of the technology disclosed herein. While each server, system, and device shown in the operating environment is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes computing devices 110, 120, 130, 140, 150, and 160. Each of devices 110, 120, 130, 140, 150, and 160 may be configured to communicate with one another via communications network 99. In some examples, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the RF communication of signals, data, and/or messages. Throughout the discussion of examples, it should be understood that the terms "data" and "information" are used interchangeably herein to refer to text, images, audio, video, or any other form of information that can exist in a computer-based environment.

Each computing device 110, 120, 130, 140, 150, and 160 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

In examples described herein, computing device 110 is a list server 110 operative to practice examples of the technology disclosed herein. In some examples, the list server 110 provides Create, Read, Update, and Delete (CRUD) functionality for lists, and products in a list, in conjunction with one or more mobile devices 120, computing devices 130 such as laptop computers, desktop computers, tablet computers, smart watches, and wearables, and home devices 140 such as Google Home appliance.

The Create function can provide application programming interfaces (APIs) from the list server 110 and graphic user interfaces (GUIs) in conjunction with web browsers (122, 132, 142) or native applications (124, 134, 144) on various devices (120, 130, 140) to the user to search across the catalog(s) visible to the list server 110 (such as internal catalogs and catalogs of shopping service 150), create lists, and shop the created lists (including shopping via shopping service 150).

The Read function can provide APIs and GUIs in a similar fashion to search for and display created lists and listed products. The Update and Delete functions provide user interfaces for editing and saving created lists and listed products. Other functionality of the technology provides APIs and GUIs for setting list administrative characteristics, and provides user interfaces for communicating and collaborating with other users.

Each of mobile device 120 and computing device 130 can receive text, touch, image, and voice inputs for CRUD, administrative, and communication functions through the corresponding browser or native application. Home device 140 primarily receives voice inputs and responds with audio outputs, though some examples of home device can interact with users via a GUI. In some examples, such inputs can be processed in conjunction with an assistant server 160 implementing a virtual personal assistant, such as Google Assistant, as part of the interface to the list server 110.

The connections illustrated are examples, and other means of establishing a communications link between the computers and devices can be used. Moreover, those having ordinary skill in the art having the benefit of the present disclosure will appreciate that the computing devices illustrated in FIG. 1 may have any of several other suitable computer system configurations. For example, computing device 130 may be embodied as wearable device and may not include all the components described above.

Figure 9:
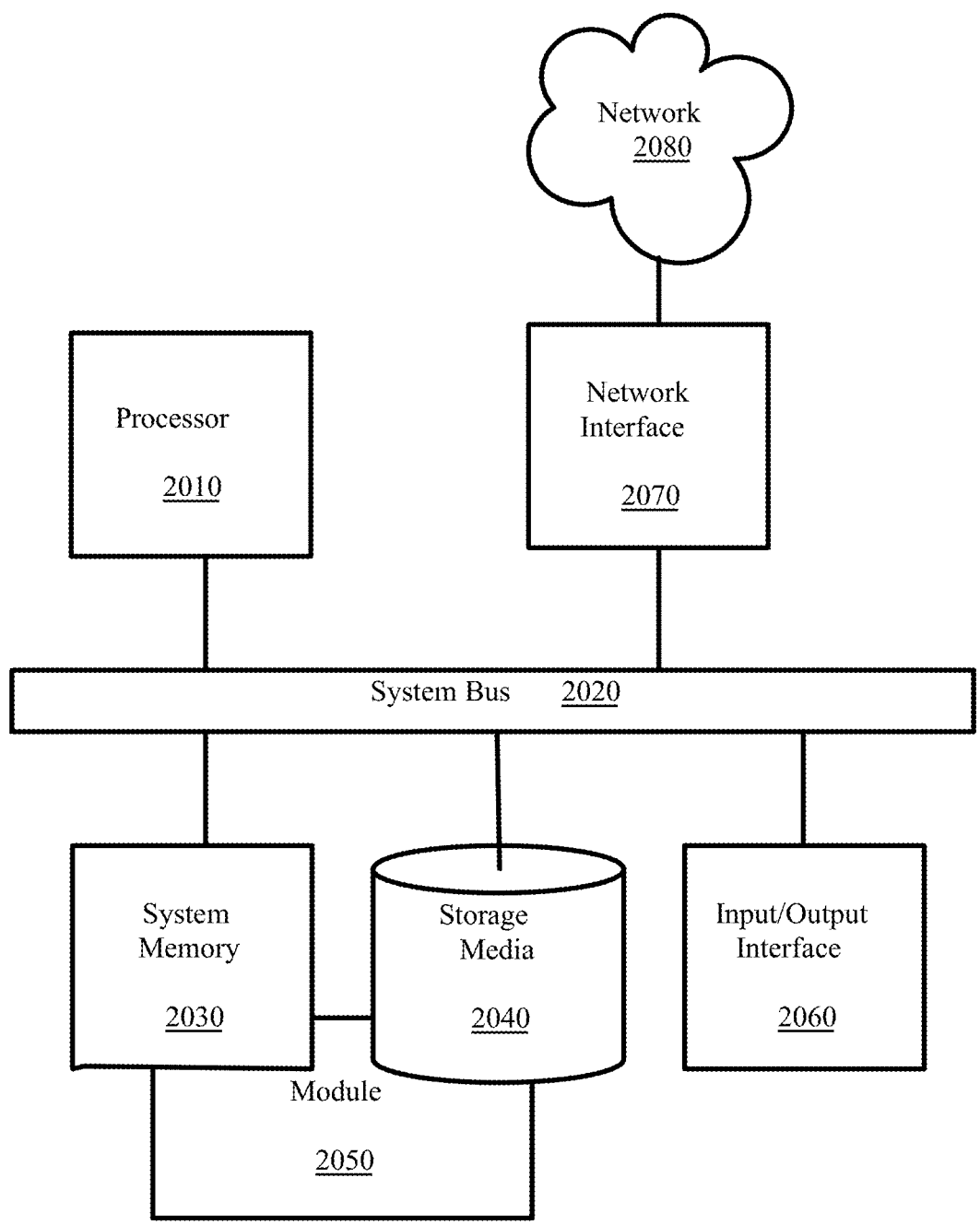
FIG. 9 is a block diagram depicting a computing machine and a module, in accordance with certain examples.

In examples, the computing devices, and any other computing machines associated with the technology presented herein, may be any type of computing machine such as, but not limited to, those discussed in more detail with respect to FIG. 9. Furthermore, any modules associated with any of these computing machines, such as modules described herein or any other modules (scripts, web content, software, firmware, or hardware) associated with the technology presented herein may be any of the modules discussed in more detail with respect to FIG. 9. The computing machines discussed herein may communicate with one another as well as other computer machines or communication systems over one or more networks, such as network 99. The network 99 may include any type of data or communications network, including any of the network technology discussed with respect to FIG. 9.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
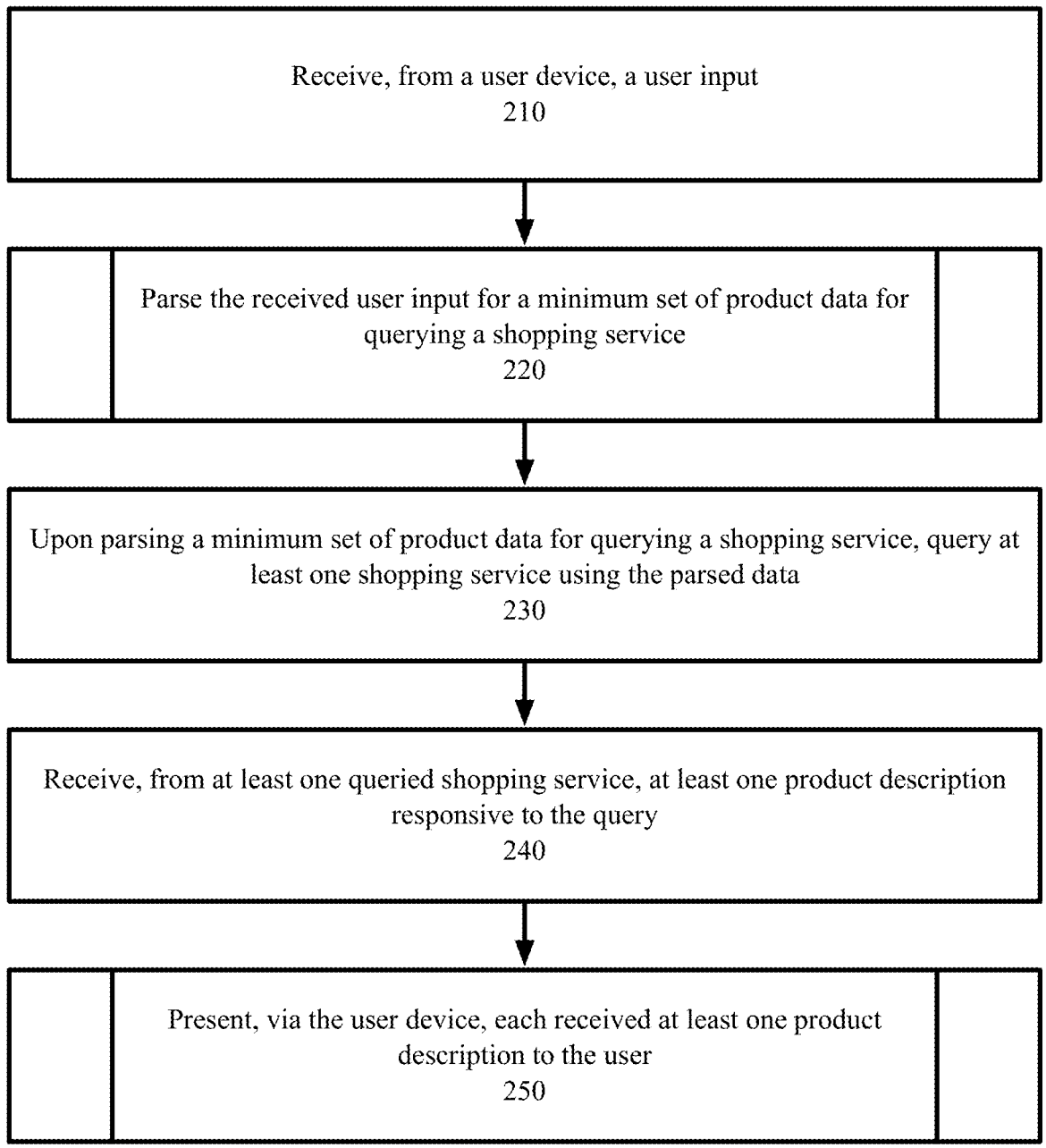
FIG. 2 is a block diagram illustrating methods to process inputs to electronic list systems, in accordance with certain examples.

Referring to FIG. 2, and continuing to refer to FIG. 1 for context, methods 200 to process inputs to electronic list systems are illustrated in accordance with certain examples. In such methods 200, the list server 110 receives a user input via a user device such as mobile device 120—Block 210. As a continuing example, consider a user providing the voice input "toys ten to fifteen dollars from wee bee toys" to a home device 140 running a native application 144 to listen for voice commands. The native application 144 transmits the received voice data to the assistant server 160 over network 99 for the assistant server 160 to perform speech-to-text-data conversion. The assistant server 160 transmits a text file corresponding to voice input to the list server 110 via an API (the receiving side of which, API 116, is shown in FIG. 1). In other examples, speech-to-text-data conversion occurs in either the user device, such as home device 140, mobile device 120, and computing device 130. In another example, the speech-to-text-data conversion occurs in list server 110 itself.

The list server 110 parses the received user input for a minimum set of product data querying a shopping service—Block 220. In the continuing example, list server 110 uses keyword lists to identify data types of single-word and multi-word elements of the text file. Specifically, "toys," which appears twice in the input, is a product genus—but also appears as part of the string "wee_bee_toys," a retailer name. In this case, the second use of "toys" is recognized as part of the string "wee_bee_toys." Note that "doll" is a product subgenus under "toys," while a stock-keeping unit (SKU) descriptor of a specifically configured doll from a specific manufacturer (and possible a specific retailer) is the most granular level. Techniques such as Natural Language Processing (NLP), machine learning and other artificial intelligence approaches, and semi-automated classification, can be used in addition to, or in place of, keyword list comparisons. The specific minimum data will vary dependent on the shopping services 150 available to the list server 110.

Referring to FIG. 3, and continuing to refer to prior figures for context, methods 300 to process inputs to electronic list systems are illustrated in accordance with certain examples. In such methods the list server 110 parses the received user input for each of type of data in the set {product genus, product subgenus(es), product name, brand name, price information, retailer name, manufacturer name, size, quantity}, wherein a minimum set of product data for querying a shopping service comprises a subset of the set—Block 322. In the continuing example, none of product subgenus(es), product name, brand name, manufacture name, size, or quantity is found, but product genus "toys," retailer "wee bee toys," and price information "ten to fifteen dollars," are found. In other example, different set elements and other hierarchy structures can are used.

Returning to FIG. 2, upon parsing a minimum set of product data for querying a shopping service, the list server 110 queries at least one shopping service 150 using the parsed data—Block 230. In the continuing example, product genus "toys," retailer "Wee Bee Toys," and price range "$10-$15" are sufficient for the list server 110 to identify a plurality of products and query the shopping service 150 using the parsed data. In the continuing example, shopping service 150 accepts a structured/tagged query {<genus="toys"> AND <retailer="Wee Bee Toys"> AND <price range=10, 15>} to shopping service Espresso 150.

The list server 110 receives at least one product description responsive to the query from at least one shopping service 150—Block 240. In the continuing example, shopping service Espresso 150 returns over two hundred product descriptions across the genus "toys," including product descriptions in "girls' toys" first-level sub-genus and "boys' toys" first-level subgenus, as well as across several second-level sub-genuses.

The list server 110 presents, via the user device, each received at least one product description to the user—Block 250. Referring to FIG. 4, and continuing to refer to prior figures for context, methods 400 for presenting each received product description are shown, in accordance with certain examples. In such examples, the list server 110 presents, via the user device 120, a plurality of matching items in a hierarchy organized by product name, with lower hierarchy levels comprising one or more of price information, retailer name, manufacturer name, size, and quantity—Block 452.

Figure 5:
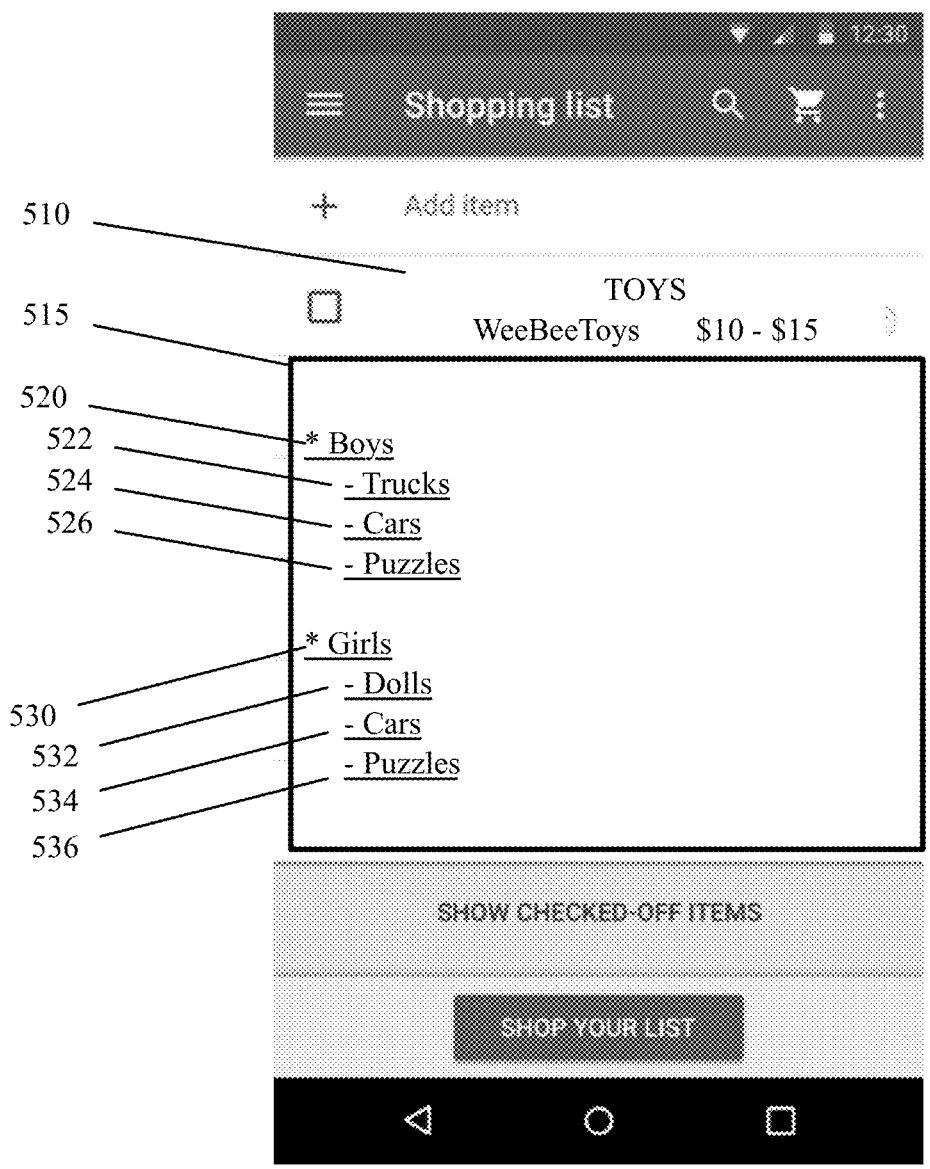
FIG. 5 is a diagram illustrating a user interface of the present technology, in accordance with certain examples.

Referring to FIG. 5, and continuing to refer to prior figures for context, a user interface screen for presenting each received product description to the user via the user device is shown, in accordance with certain examples. In the continuing example, a user interface screen 500 for user device 120 presented via native application 144 includes the initial input "toys" from "WeeBee Toys" for the price range "$10-$15" as list item 510 along with a hierarchical representation 515 of the results returned by shopping service 150. The list item entry includes the retailer "WeeBee Toys" and price range "$10-$15" parsed from the user input. The hierarchical representation 515 includes two second-level entries "Boys" 520 and "Girls" 530, each of which are hyperlinked to separate native application 144 user interface screens presenting those results under each respective heading. User interface screen 500 shows the "Boys" 520 sub-list to include lower levels of the hierarchy for "trucks" 522, "cars" 524, and "puzzles" 526. User interface screen 500 also shows the "Girls" 530 sub-list to include lower levels of the hierarchy for "dolls" 532, "cars" 534, and "puzzles" 536.

Figure 6:
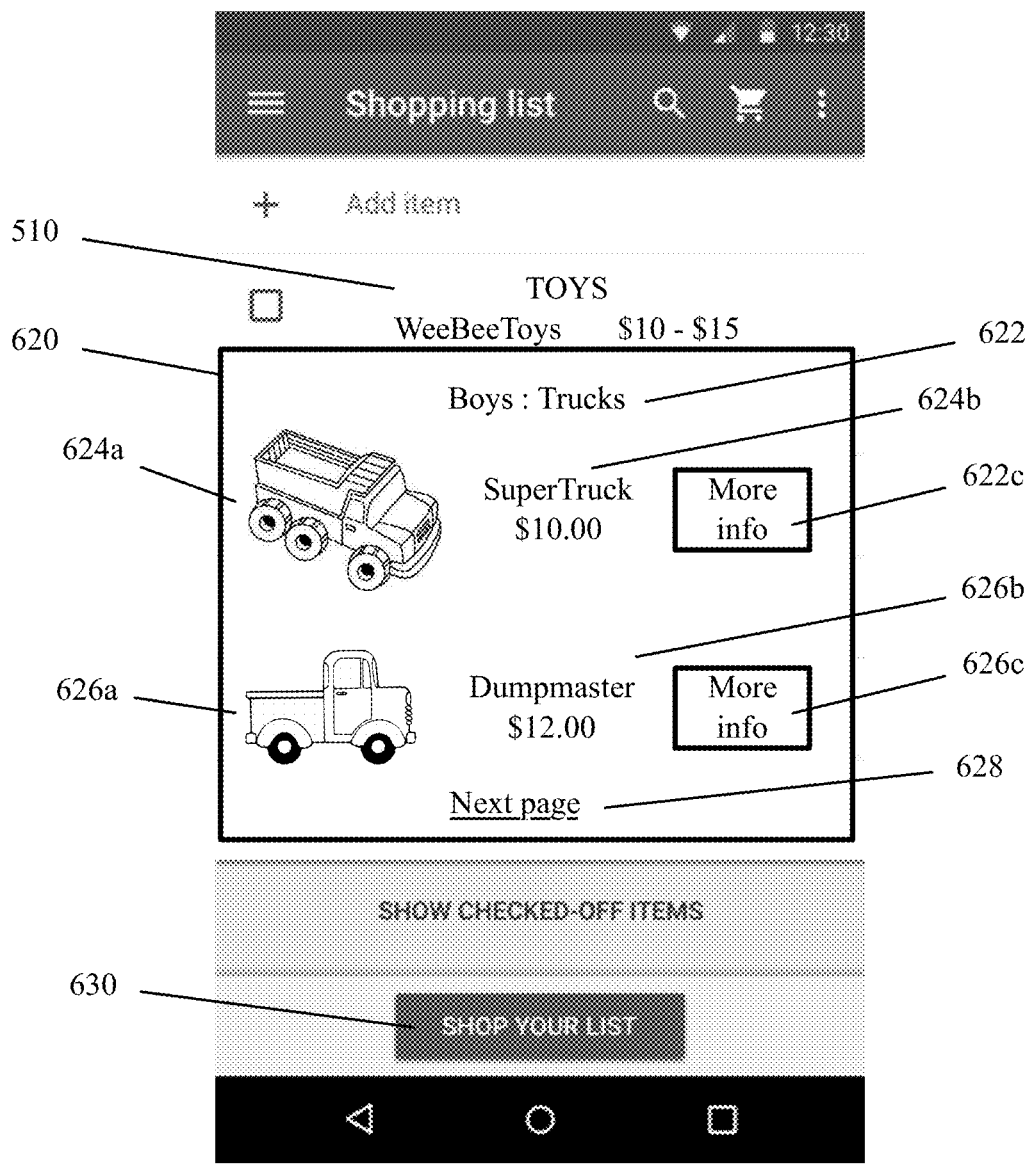
FIG. 6 is a diagram illustrating a user interface of the present technology, in accordance with certain examples.

Referring to FIG. 6, and continuing to refer to prior figures for context, a user interface screen 600 for presenting each received product description to the user via the user device is shown, in accordance with certain examples. In the continuing example, a user interface screen 600 for user device 120 presented via native application 144 is presented in response to the user selecting the "Trucks" hyperlink 522. The user interface screen 600 includes product list window 620. Product list window 620 displays product entries for two products (SuperTruck 624 and Dumpmaster 626) of thirty entries returned in the category "Boys:Trucks" 622 from shopping service 150 in response to the query built from the user input. The SuperTruck entry 624 includes an illustration 624a, name and price 624b, and a "More info" button 622c. The Dumpmaster entry 626 includes similar components for illustration 626a, name and price 626b, and "More info" button 626c. The product list window also includes a hyperlinked "Next Page" link for viewing the remaining product entries in in the category returned from shopping service 150 in response to the query. Selecting the "More info" button will cause the list server 110 to display a product page for the corresponding product via the user device 120. While the user can use the list for tracking in-person shopping at brick-and-mortar retail locations, the user interface screen 600 also includes a "SHOP YOUR LIST" button 630 that will, in some examples, link to a product page of the user interface. While FIG. 6 shows one checkbox entry of the list, the list can, and in most instances will, include multiple items. Depending on the display capabilities of the user device, more than one item per page can be displayed. With each type of user device, the technology can display multiple items across multiple pages.

Figure 7:
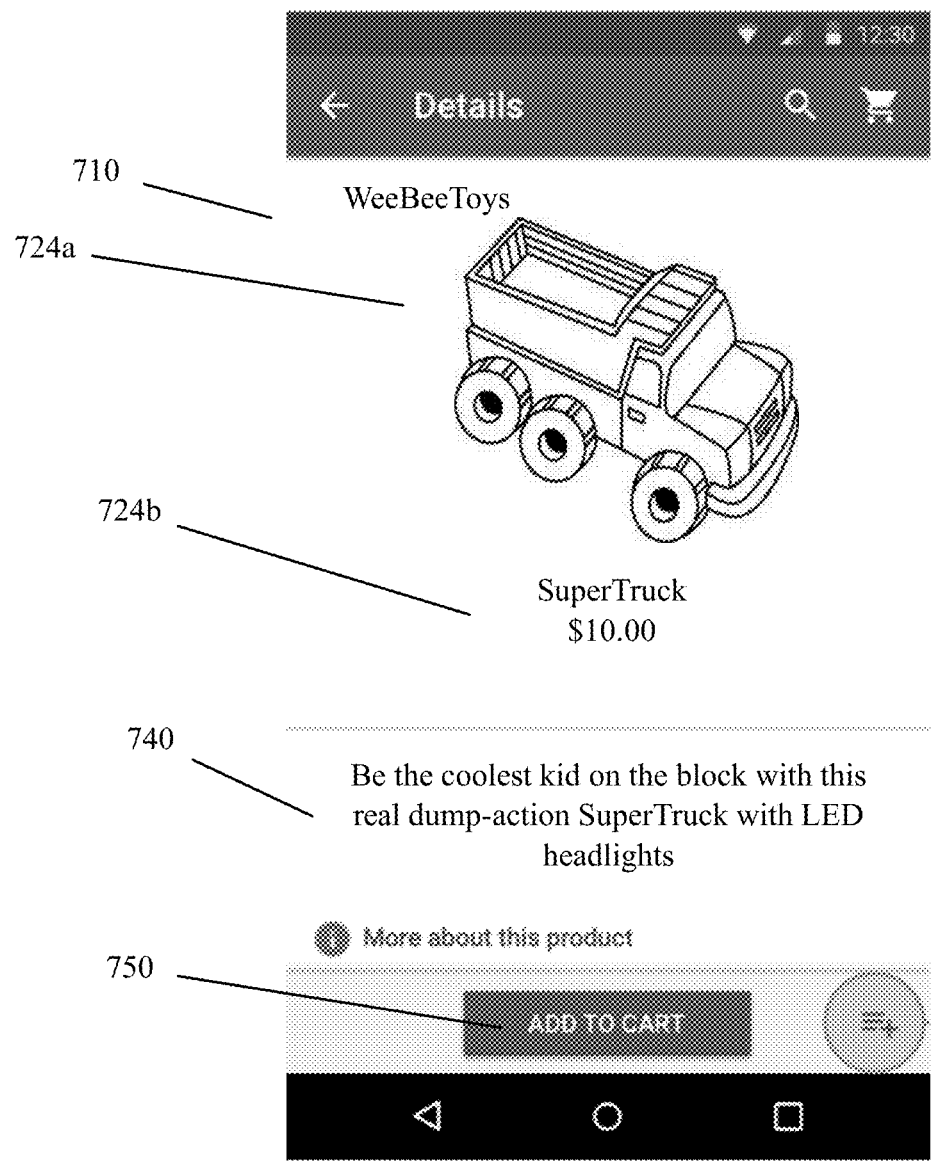
FIG. 7 is a diagram illustrating a user interface of the present technology, in accordance with certain examples.

Referring to FIG. 7, and continuing to refer to prior figures for context, a user interface screen 700 for presenting each received product description to the user via the user device is shown, in accordance with certain examples. In the continuing example, a user interface screen 700 for user device 120 presented via native application 144 includes product page 710. Product page 710 includes image 724a and product title 724b similar to those shown in connection with FIG. 6, along with product description 730. In particular, interface screen 700 includes "ADD TO CART" button 740 that adds the item to the user's cart for checkout. If the user is using the list to shop in person, then the list view of FIG. 5 and FIG. 6.

Figure 8:
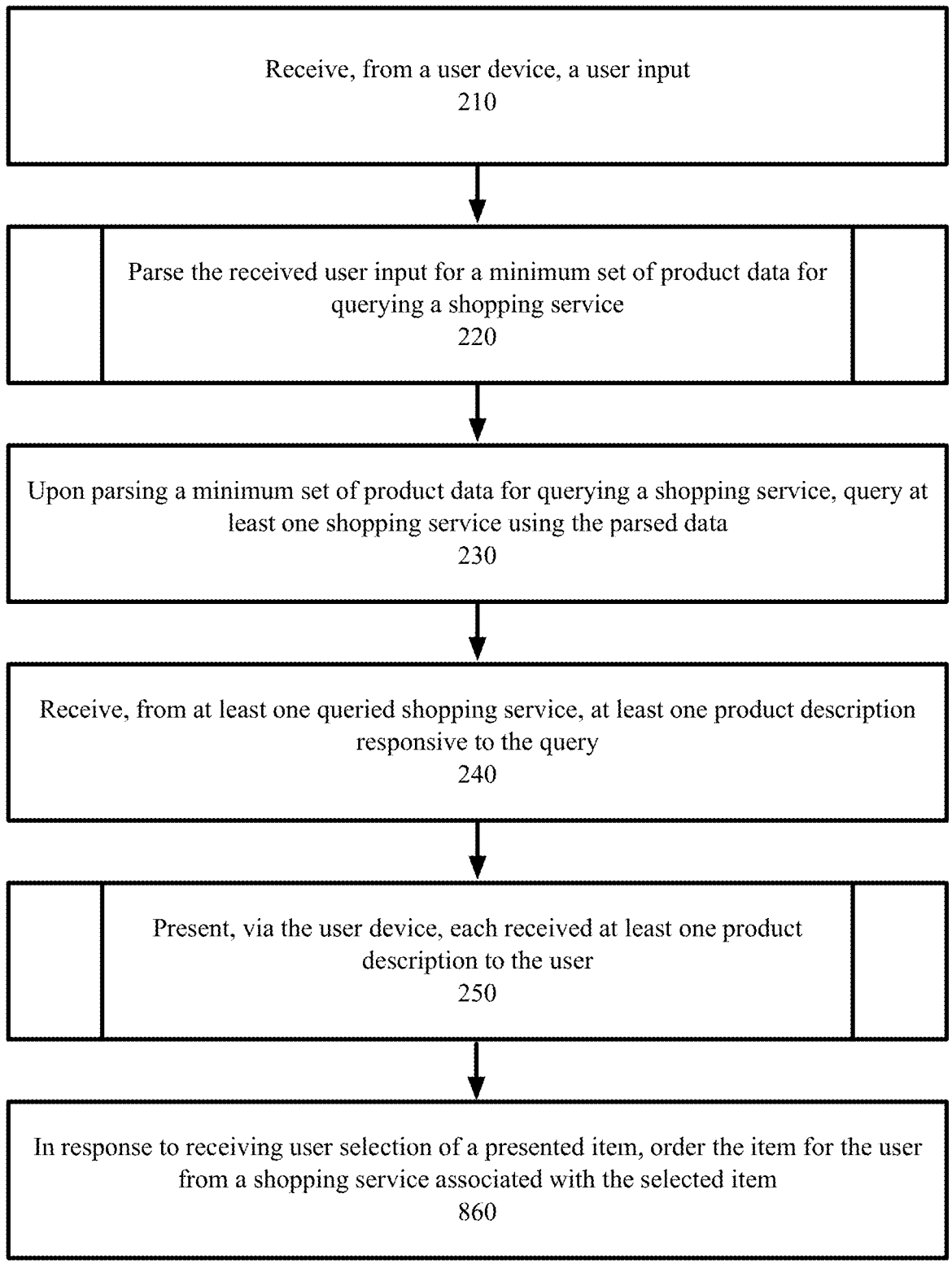
FIG. 8 is a block diagram illustrating methods to process inputs to electronic list systems, in accordance with certain examples.

Referring to FIG. 8, and continuing to refer to prior figures for context, methods 300 to process inputs to electronic list systems are illustrated in accordance with certain examples. In such methods, the list server 110, in response to receiving user selection of a presented item, orders the item for the user from a shopping service associated with the selected item. In the continuing example, selection of the "ADD TO CART" 750 button initiated the order process.

Other Examples

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

The present technology may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the present technology in computer programming, and the examples should not be construed as limited to any one set of computer program instructions. Further, a skilled programmer would be able to write such a computer program to implement the present technology as described herein based on the appended flow charts and associated description in the application text. Therefore, disclosure of a particular set of program code instructions is not considered necessary for an adequate understanding of how to make and use the technology described herein. Further, those skilled in the art will appreciate that one or more aspects of the technology described herein may be performed by hardware, software, or a combination thereof, as may be embodied in one or more computing systems. Moreover, any reference to an act being performed by a computer should not be construed as being performed by a single computer as more than one computer may perform the act.

The technology described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of technology described herein defined in the following claims, the scope of which is to be accorded the broadest interpretation so as to encompass such modifications and equivalent structures.

What is claimed is:

1. A computer-implemented method to process inputs to electronic list systems, comprising:

receiving, by one or more computing devices of an electronic list system from a client device, input received from an input interface of the client device;

parsing, by the one or more computing devices, the input to identify one or more types of data in the input to use to form a set of product data for generation of one or more queries to one or more shopping services;

identifying, by the one or more computing devices, at least one shopping service of the one or more shopping services that is configured to accept a query comprising the one or more types of data identified from parsing the input;

generating, by the one or more computing devices, one or more queries from based on the set of product data formed based on the one or more types of data identified from parsing the input;

querying, by the one or more computing devices using the one or more queries generated by the one or more computing devices from the set of product data, each of: i) the at least one shopping service of the one or more shopping services, ii) a database of the electronic list system, and iii) an electronic messaging account associated with the client device, the at least one shopping service different from the electronic list system;

receiving, by the one or more computing devices, at least one product description responsive to the one or more queries to the at least one shopping service, the database of the electronic list system, and the electronic messaging account associated with the client device; and transmitting, by the one or more computing devices to the client device via a network, the at least one product description to cause the client device to present the at least one product description via an output interface of the client device.

2. The method of claim 1, wherein parsing comprises, parsing, by the one or more computing devices, the input for each type of data in a set {product genus, product subgenus, product name, brand name, price information, retailer name, manufacturer name, size, quantity}, wherein a minimum set of product data for querying the one or more shopping services comprises a subset of the set.

3. The method of claim 1, wherein the input is a voice input, and the input interface comprises a microphone.

4. The method of claim 1, further comprising:
receiving, by the one or more computing devices, from the client device a selection of a presented item corresponding to the at least one product description output by the client device via the output interface.

5. The method of claim 4, further comprising:
in response to receiving the selection of the presented item, ordering, by the one or more computing devices, the item from a shopping service associated with the selection of the presented item.

6. The method of claim 1, comprising:
transmitting, by the one or more computing devices to the client device for presentation by the client device via the output interface, a plurality of matching items in a hierarchy organized by product name, with lower hierarchy levels comprising one or more of price information, retailer name, manufacturer name, size, and quantity.

7. The method of claim 6, comprising:
providing the product name as an item in a list along with the hierarchy organized by product name.

8. A computer program product, comprising:
a non-transitory computer-readable storage device having computer-executable program instructions embodied thereon that when executed by a computer cause the computer to process inputs to electronic list systems, the computer-executable program instructions comprising instructions to:
receive, from a client device, an input received from an input interface of the client device;
parse the input to identify one or more types of data in the input to use to form a set of product data for generation of one or more queries to one or more shopping services;
identify at least one shopping service of the one or more shopping services that is configured to accept a query comprising the one or more types of data identified from parsing the input;
generate one or more queries from the set of product data formed based on the one or more types of data identified from parsing the input;
query, using the one or more queries generated by the one or more computing devices from the set of product data, each of: i) the at least one shopping service of the one or more shopping services, ii) a database of an electronic list system, and iii) an electronic messaging account associated with the client device, the at least one shopping service different from the electronic list system;
receive at least one product description responsive to the one or more queries to the at least one shopping service, the database of the electronic list system, and the electronic messaging account associated with the client device; and
transmit, to the client device via a network, the at least one product description to cause the client device to present the at least one product description via an output interface of the client device.

9. The computer program product of claim 8, comprising:
computer-executable program instructions to parse the input for each type of data in a set {product genus, product subgenus, product name, brand name, price information, retailer name, manufacturer name, size, quantity}, wherein a minimum set of product data for querying the one or more shopping services comprises a subset of the set.

10. The computer program product of claim 8, wherein the input is a voice input, and the input interface comprises a microphone.

11. The computer program product of claim 8, further comprising:
computer-executable program instructions to receive from the client device a selection of a presented item corresponding to the at least one product description output by the client device via the output interface.

12. The computer program product of claim 11, further comprising:
computer-executable program instructions to order the presented item responsive to the selection from a shopping service associated with the at least one product description.

13. The computer program product of claim 8, comprising:
computer-executable program instructions to transmit, to the client device, a plurality of matching items in a hierarchy organized by product name, with lower hierarchy levels comprising one or more of price information, retailer name, manufacturer name, size, and quantity.

14. The computer program product of claim 13, comprising:
computer-executable program instructions to cause presentation of the product name as an item in a list along with the hierarchy organized by product name.

15. A system to communicate digital data between computing devices using sound, the system comprising:
a storage device; and
a processor communicatively coupled to the storage device, wherein the processor executes application code instructions that are stored in the storage device to cause the system to:
receive, from a client device, an input received from an input interface of the client device;
parse the input to identify one or more types of data in the input to use to form a set of product data for generation of one or more queries to one or more shopping services;
identify at least one shopping service of the one or more shopping services that is configured to accept a query comprising the one or more types of data identified from parsing the input;
generate one or more queries based on the set of product data formed based on the one or more types of data identified from parsing the input;
query, using the one or more queries generated by the one or more computing devices from the set of product data, each of: i) the at least one shopping service of the one or more shopping services, ii) a database of an electronic list system, and iii) an electronic messaging account associated with the client device, the at least one shopping service different from the electronic list system;
receive at least one product description responsive to the one or more queries to the at least one shopping service, the database of the electronic list system, and the electronic messaging account associated with the client device; and transmit, to the client device via a network, the at least one product description to cause the client device to present the at least one product description via an output interface of the client device.

16. The system of claim 15, comprising the processor to:

parse the input for each type of data in a set {product genus, product subgenus, product name, brand name, price information, retailer name, manufacturer name, size, quantity}, wherein a minimum set of product data for querying the one or more shopping services comprises a subset of the set.

17. The system of claim 15, wherein the input is a voice input, and the input interface comprises a microphone.

18. The system of claim 15, further comprising:

the processor to receive from the client device a selection of a presented item corresponding to the at least one product description output by the client device via the output interface.

19. The system of claim 18, further comprising:

the processor to order the presented item responsive to the selection from a shopping service associated with the at least one product description.

20. The system of claim 15, further comprising:

the processor to transmit, to the client device for presentation via the output interface of the client device, a plurality of matching items in a hierarchy organized by product name, with lower hierarchy levels comprising one or more of price information, retailer name, manufacturer name, size, and quantity.

* * * * *